(12) United States Patent
Lee et al.

(10) Patent No.: US 9,063,594 B2
(45) Date of Patent: Jun. 23, 2015

(54) ELECTRONIC DEVICE

(75) Inventors: Gangyoung Lee, Seoul (KR); Doyoun Kim, Gwangju (KR)

(73) Assignee: LG ELECTRONICS INC., Seoul (KR)

( * ) Notice: Subject to any disclaimer, the term of this patent is extended or adjusted under 35 U.S.C. 154(b) by 333 days.

(21) Appl. No.: 13/595,068

(22) Filed: Aug. 27, 2012

(65) Prior Publication Data
US 2013/0147728 A1  Jun. 13, 2013

(30) Foreign Application Priority Data
Dec. 12, 2011  (KR) .................. 10-2011-0133012

(51) Int. Cl.
*H05K 7/02* (2006.01)
*G06F 3/041* (2006.01)
(52) U.S. Cl.
CPC ...... *G06F 3/041* (2013.01); *G06F 2203/04103* (2013.01)

(58) Field of Classification Search
CPC ............. G06F 3/041; G06F 3/00; G09G 3/36; H05K 7/02
USPC .......................................... 345/156, 173–178
See application file for complete search history.

(56) References Cited

U.S. PATENT DOCUMENTS

| 2010/0156818 | A1* | 6/2010 | Burrough et al. | 345/173 |
| 2010/0177050 | A1* | 7/2010 | Heubel et al. | 345/173 |
| 2011/0115784 | A1* | 5/2011 | Tartz et al. | 345/419 |
| 2011/0157052 | A1* | 6/2011 | Lee et al. | 345/173 |

* cited by examiner

*Primary Examiner* — Andrew Sasinowski
(74) *Attorney, Agent, or Firm* — Ked & Associates, LLP (57) ABSTRACT

An electronic device is provided. The electronic device may include a terminal main body, and a ductile member made of an elastically deformable material positioned such that a deformation of the ductile member is exposed to the outside of the main body. An electro-active substance may be accommodated in a chamber defined in the ductile member, and may be contracted or expanded by power supplied thereto by a power supply device.

19 Claims, 11 Drawing Sheets

ELECTRONIC DEVICE

CROSS-REFERENCE TO RELATED APPLICATION(S)

This application claims priority under 35 U.S.C. §119 to Korean Application No. 10-2011-0133012 filed on Dec. 12, 2011, whose entire disclosure is hereby incorporated by reference.

BACKGROUND

1. Field

This relates to an electronic device, and in particular, to an electronic device, including a haptic device.

2. Background

In general, electronic devices may be classified into mobile, or portable, devices and stationary devices. Mobile devices may be, for example, handheld or vehicle mounted. An electronic device may support various functions such as capturing images or video, reproducing music or video files, playing games, receiving broadcast signals, and the like, and thus may be embodied in the form of a multimedia player or a device. Various hardware and/or software improvements and design changes may allow the user to use the electronic device more conveniently. For example, a haptic device which supplies feedback to the terminal in the form of, for example, vibration, may be one such improvement.

BRIEF DESCRIPTION OF THE DRAWINGS

The embodiments will be described in detail with reference to the following drawings in which like reference numerals refer to like elements wherein.

DETAILED DESCRIPTION

Description will now be provided in detail of various exemplary embodiments, with reference to the accompanying drawings. For the sake of brief description with reference to the drawings, the same or equivalent components will be provided with the same reference numbers, and description thereof will not be repeated.

Hereinafter, description of an electronic device may include suffixes attached to components of the wireless speaker, such as 'module' or 'unit' or 'portion' merely to facilitate description thereof.

One of mobile electronic devices is a mobile terminal. A mobile terminal as embodied and broadly described herein may include a portable phone, a smart phone, a laptop computer, a tablet computer, a digital broadcasting terminal, Personal Digital Assistants (PDA), Portable Multimedia Player (PMP), a navigation system, and other such devices.

Figure 1:
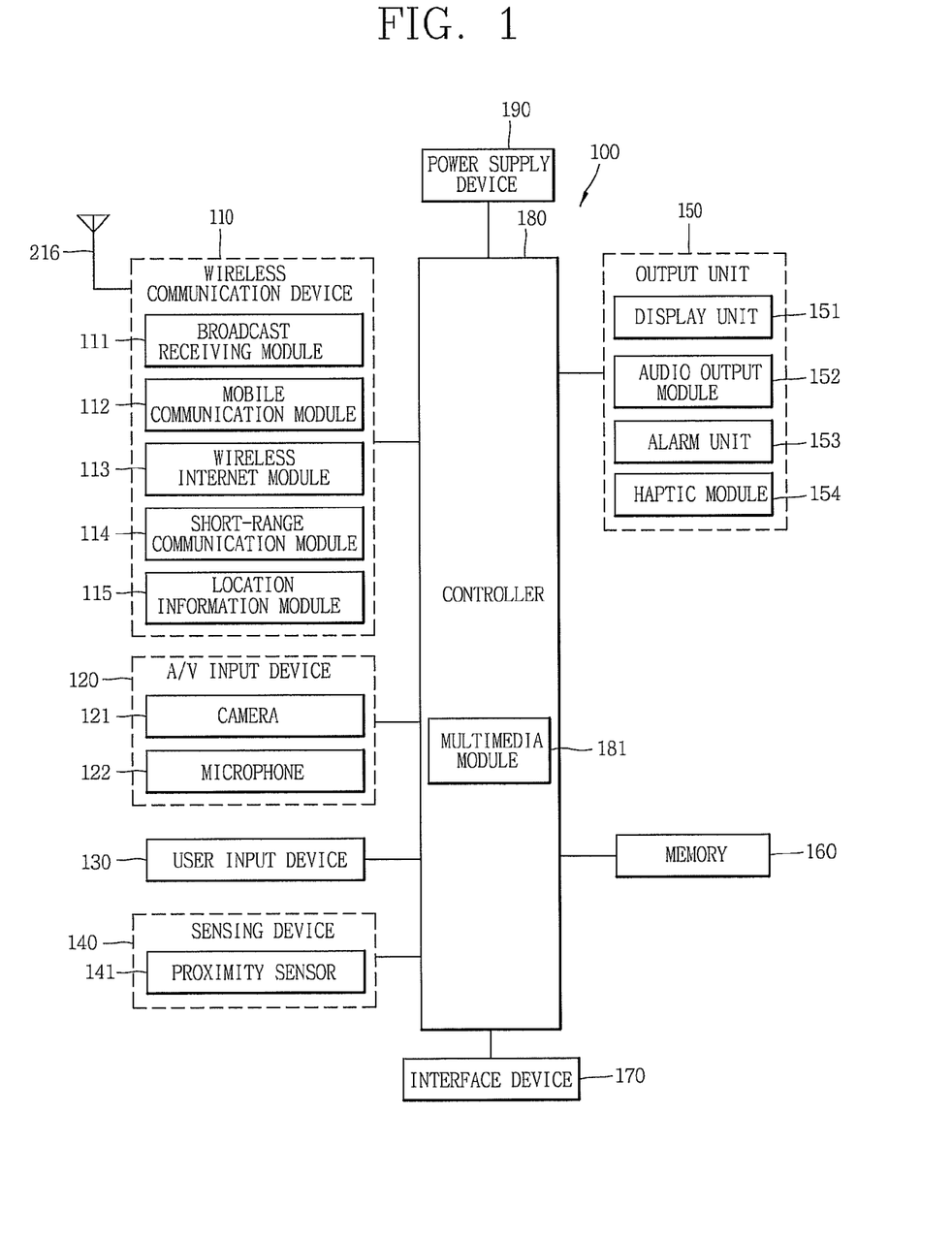
FIG. 1 is a block diagram of an electronic device according to an embodiment as broadly described herein.

The electronic device 100, for example the mobile terminal, shown in FIG. 1 may include a wireless communication device 110, an Audio/Video (NV) input device 120, a user input device 130, a sensing device 140, an output device 150, a memory 160, an interface device 170, a controller 180, a power supply 190, and other such components. FIG. 1 shows the electronic device 100 having various components, but it is understood that all of the illustrated components are not necessarily required. Greater or fewer components may be implemented.

The wireless communication device 110 may typically include one or more components which provide for wireless communication between the electronic device 100 and a wireless communication system or between the electronic device 100 and a network within which the electronic device 100 is located. For example, the wireless communication device 110 may include a broadcast receiving module 111, a mobile communication module 112, a wireless internet module 113, a short-range communication module 114, a position information module 115 and other such components.

The broadcast receiving module 111 may receive broadcast signals and/or broadcast associated information from an external broadcast management server (or other network entity) via a broadcast channel. The broadcast channel may include a satellite channel and/or a terrestrial channel. The broadcast management server may be a server that generates and transmits a broadcast signal and/or broadcast associated information or a server that receives a previously generated broadcast signal and/or broadcast associated information and transmits the same to a terminal. The broadcast associated information may refer to information associated with a broadcast channel, a broadcast program or a broadcast service provider. The broadcast signal may include a TV broadcast signal, a radio broadcast signal, a data broadcast signal, and the like. Also, the broadcast signal may further include a broadcast signal combined with a TV or radio broadcast signal.

The broadcast associated information may also be provided via a mobile communication network and, in this case, the broadcast associated information may be received by the mobile communication module 112.

The broadcast signal may exist in various forms. For example, it may exist in the form of an electronic program guide (EPG) of digital multimedia broadcasting (DMB), electronic service guide (ESG) of digital video broadcast-handheld (DVB-H), and the like.

The broadcast receiving module 111 may be configured to receive signals using various types of broadcast systems. For example, the broadcast receiving module 111 may receive a digital broadcast using a digital broadcast system such as multimedia broadcasting-terrestrial (DMB-T), digital multimedia broadcasting-satellite (DMB-S), digital video broadcast-handheld (DVB-H), the data broadcasting system known as media forward link only (MediaFLO®), integrated services digital broadcast-terrestrial (ISDB-T), and other such systems. The broadcast receiving module 111 may be configured to be suitable for every broadcast system that provides a broadcast signal as well as the above-mentioned digital broadcast systems.

Broadcasting signals and/or broadcasting associated information received through the broadcast receiving module 111 may be stored in the memory 160.

The mobile communication module 112 may transmit/receive wireless signals to/from at least one of a variety of network entities (e.g., base station, an external terminal, a server, etc.) on a mobile communication network. Such wireless signals may include an audio call signal, a video call signal, or various formats of data according to transmission/reception of text/multimedia messages.

The wireless Internet module 113 may support wireless Internet access for the electronic device. This module may be internally or externally coupled to the electronic device 100. Examples of such wireless Internet access may include Wireless LAN (WLAN) (Wi-Fi), Wireless Broadband (Wibro), World Interoperability for Microwave Access (Wimax), High Speed Downlink Packet Access (HSDPA), and the like.

The short-range communication module 114 may provide for short-range communications implemented by, for example, BLUETOOTH, Radio Frequency IDentification (RFID), Infrared Data Association (IrDA), Ultra-WideBand (UWB), ZigBee, and the like.

The position information module 115 may sense or calculate a position of an electronic device. An example of the position information module 115 may include a Global Position System (GPS) module.

Referring to FIG. 1, the A/V input device 120 may receive an audio or video signal. The A/V input device 120 may include a camera 121, a microphone 122 and other components as appropriate. The camera 121 may process image data of still pictures or video acquired by an image capture device in a video capturing mode or an image capturing mode. The processed image frames may be displayed on a display 151 of the output device 150.

The image frames processed by the camera 121 may be stored in the memory 160 or transmitted via the wireless communication device 110. In certain embodiments, two or more cameras 121 may be provided, according to the configuration of the electronic device.

The microphone 122 may receive sounds (audible data) via a microphone in a phone call mode, a recording mode, a voice recognition mode, and the like, and may process such sounds into audio data. The processed audio (voice) data may be converted for output into a format transmittable to a mobile communication base station via the mobile communication module 112 in case of the phone call mode. The microphone 122 may implement various types of noise canceling (or suppression) algorithms to cancel (or suppress) noise or interference generated in the course of receiving and transmitting audio signals.

The user input device 130 may generate key input data from commands entered by a user to control various operations of the mobile communication terminal. The user input device 130 may include a keypad, a dome switch, a touch pad (e.g., a touch sensitive member that detects changes in resistance, pressure, capacitance, etc. due to being contacted) a jog wheel, a jog switch, and the like.

The sensing device 140 may detect a current status (or state) of the electronic device 100 such as an opened or closed state of the electronic device 100, a location of the electronic device 100, the presence or absence of user contact with the electronic device 100 (e.g., touch inputs), the orientation of the electronic device 100, an acceleration or deceleration movement and direction of the electronic device 100, etc., and may generate commands or signals for controlling the operation of the electronic device 100. For example, when the electronic device 100 is implemented as a slide type mobile phone, the sensing device 140 may sense whether the slide phone is open or closed. In addition, the sensing device 140 may detect whether or not the power supply 190 supplies power or whether or not the interface device 170 is coupled with an external device. The sensing device 140 may include a proximity sensor 141.

The output device 150 may provide outputs in a visual, audible, and/or tactile manner. The output device 150 may include the display 151, an audio output module 152, an alarm 153, a haptic module 154, and the like.

The display 151 may display information processed in the electronic device 100. For example, when the electronic device 100 is in a phone call mode, the display 151 may display a User Interface (UI) or a Graphic User Interface (GUI) associated with a call or other communication (such as text messaging, multimedia file downloading, etc.). When the electronic device 100 is in a video call mode or image capturing mode, the display 151 may display a captured image and/or received image, a UI or GUI that shows videos or images and functions related thereto, and the like.

The display 151 may include at least one of a Liquid Crystal Display (LCD), a Thin Film Transistor-LCD (TFT-LCD), an Organic Light Emitting Diode (OLED) display, a flexible display, a three-dimensional (3D) display, or the like.

Some of these displays may be transparent so that outside may be seen therethrough, and may be referred to as a transparent display. A representative example of such a transparent display may include a Transparent Organic Light Emitting Diode (TOLED), and the like. The rear surface portion of the display 151 may also be optically transparent so that a user may view an object positioned at a rear side of a body through a region occupied by the display 151 of the body.

In certain embodiments, two or more displays 151 may be implemented, according to a configured aspect of the electronic device 100. For instance, a plurality of displays may be arranged on one surface, integrally or separately, or may be arranged on different surfaces.

If the display 151 and a touch sensitive sensor (referred to as a touch sensor) have a layered structure therebetween, the structure may be referred to as a touch screen. The display 151 may be also used as an input device rather than just an output device. The touch sensor may be implemented as a touch film, a touch sheet, a touch pad, and the like.

The touch sensor may be configured to convert changes of a pressure applied to a specific part of the display 151, or a capacitance occurring from a specific part of the display 151, into electric input signals. Also, the touch sensor may be configured to sense not only a touched position and a touched area, but also a touch pressure.

When touch inputs are sensed by the touch sensors, corresponding signals may be transmitted to a touch controller. The touch controller may process the received signals, and then transmit corresponding data to the controller 180. Accordingly, the controller 180 may sense which region of the display 151 has been touched.

Referring to FIG. 1, a proximity sensor 141 may be arranged, for example, at an inner region of the electronic device 100 blocked by the touch screen, or near the touch screen. The proximity sensor 141 may sense presence or absence of an object approaching a surface to be sensed, or an object disposed near a surface to be sensed, by using an electromagnetic field or infrared rays, without a mechanical contact. The proximity sensor 141 may have a longer lifespan and a more enhanced utility than a contact sensor.

The proximity sensor 141 may include, for example, a transmissive type photoelectric sensor, a direct reflective type photoelectric sensor, a mirror reflective type photoelectric sensor, a high-frequency oscillation proximity sensor, a capacitance type proximity sensor, a magnetic type proximity sensor, an infrared rays proximity sensor, and other such sensors. When the touch screen is implemented as a capacitance type, proximity of a pointer to the touch screen may be sensed by changes in an electromagnetic field. In this case, the touch screen (touch sensor) may be categorized as a proximity sensor.

Hereinafter, for the sake of brief explanation, a situation in which the pointer is positioned proximate the touch screen, without contacting the touch screen, will be referred to as a 'proximity touch', whereas a situation in which the pointer substantially comes in contact with the touch screen will be referred to as a 'contact touch'. For the position corresponding to the proximity touch of the pointer on the touch screen, such a position may correspond to a position where the pointer faces substantially perpendicular to the touch screen upon the proximity touch of the pointer.

The proximity sensor 141 may sense proximity touch, and proximity touch patterns (e.g., distance, direction, speed, time, position, moving status, etc.). Information relating to the sensed proximity touch and the sensed proximity touch patterns may be output onto the touch screen.

The audio output module 152 may convert and output as sound audio data received from the wireless communication device 110 or stored in the memory 160 in a call signal reception mode, a call mode, a record mode, a voice recognition mode, a broadcast reception mode, and the like. The audio output module 152 may provide audible outputs related to a particular function performed by the electronic device 100 (e.g., a call signal reception sound, a message reception sound, etc.). The audio output module 152 may include, for example, a speaker, a buzzer, and the like.

The alarm 153 may provide outputs corresponding to the occurrence of an event of the electronic device 100. Typical events may include call reception, message reception, key signal inputs, a touch input, etc. In addition to audio or video outputs, the alarm 153 may provide outputs in a different manner to inform about the occurrence of an event. The video signal or the audio signal may be output via the display 151 or the audio output module 152. Accordingly, the display 151 or the audio output module 152 may, in some circumstances, be considered part of the alarm 153.

The haptic module 154 may generate various tactile effects which a user may feel, such as, for example, vibration. Vibration generated by the haptic module 154 may have a controllable intensity, a controllable pattern, and so on. For instance, different vibration may be output in a synthesized manner or in a sequential manner.

The haptic module 154 may generate various tactile effects, including not only vibration, but also an arrangement of pins vertically moving with respect to a contact area (such as, for example, along the skin of a user's finger), air injection force or air suction force through an injection hole or a suction hole, touch by a skin surface, presence or absence of contact with an electrode, effects by stimulus such as an electrostatic force, reproduction of cold or hot feeling using a heat absorbing device or a heat emitting device, and the like.

The haptic module 154 may be configured to transmit tactile effects, or signals, through a user's direct contact, or a user's muscular sense using, for example, a finger or a hand.

In certain embodiments, two or more haptic modules 154 may be implemented according to the configuration of the electronic device 100.

The memory 160 may store a program for the processing and control, may temporarily store input/output data (e.g., phonebook data, messages, still images, video and the like), and may store data relating to various patterns of vibrations and audio output upon the touch input on the touch screen.

The memory 160 may be implemented using a storage medium such as, for example, a flash memory, a hard disk, a multimedia card micro, a memory card (e.g., SD or DX memory), Random Access Memory (RAM), Static Random Access Memory (SRAM), Read-Only Memory (ROM), Electrically Erasable Programmable Read-only Memory (EEPROM), Programmable Read-only Memory (PROM), magnetic memory, magnetic disk, optical disk, and the like. The electronic device 100 may perform a web storage operation which performs the storage function of the memory 160 on the Internet.

The interface device 170 may provide an interface between the electronic device 100 and various external devices. The interface device 170 may allow data reception from an external device, power delivery to each component in the electronic device 100, and/or data transmission from the electronic device 100 to an external device. The interface device 170 may include, for example, wired/wireless headset ports, external charger ports, wired/wireless data ports, memory card ports, ports for coupling devices having an identification module, audio Input/Output (I/O) ports, video I/O ports, earphone ports, and the like.

The identification module may be configured as a chip for storing various information required to authenticate an authority to use the electronic device 100, which may include a User Identity Module (UIM), a Subscriber Identity Module (SIM), a Universal Subscriber Identity Module (USIM), and the like. A device having such an identification module (hereinafter, referred to as an 'identification device') may be implemented in a type of smart card. Hence, the identification device may be coupled to the electronic device 100 via a port.

The interface device 170 may also serve as a path for power to be supplied from an external cradle to the electronic device 100 when the electronic device 100 is connected to the external cradle, or as a path for transferring various command signals inputted from the cradle by a user to the electronic device 100. Such various command signals or power inputted from the cradle may operate as signals for recognizing that the electronic device 100 has accurately been mounted to the cradle.

The controller 180 may control the overall operation of the electronic device 100. For example, the controller 180 may perform the control and processing associated with telephony calls, data communications, video calls, and the like. The controller 180 may include a multimedia module 181 which provides multimedia playback. The multimedia module 181 may be configured as part of the controller 180 or as a separate component.

The controller 180 may perform pattern recognition processing so as to recognize writing or drawing input on the touch screen as text or image.

The power supply 190 may supply power to each component by receiving external power or internal power under control of the controller 180.

Various embodiments described herein may be implemented in a computer-readable medium using, for example, software, hardware, or some combination thereof.

For a hardware implementation, the embodiments described herein may be implemented within one or more of Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, micro-controllers, micro processors, other electronic units designed to perform the functions described herein, or a selective combination thereof. In some cases, such embodiments may be implemented by the controller 180.

For software implementation, the embodiments such as procedures and functions may be implemented together with separate software modules each of which performs at least one of functions and operations. The software codes can be implemented with a software application written in any suitable programming language. The software codes may be stored in the memory 160 and executed by the controller 180.

Figure 2A:
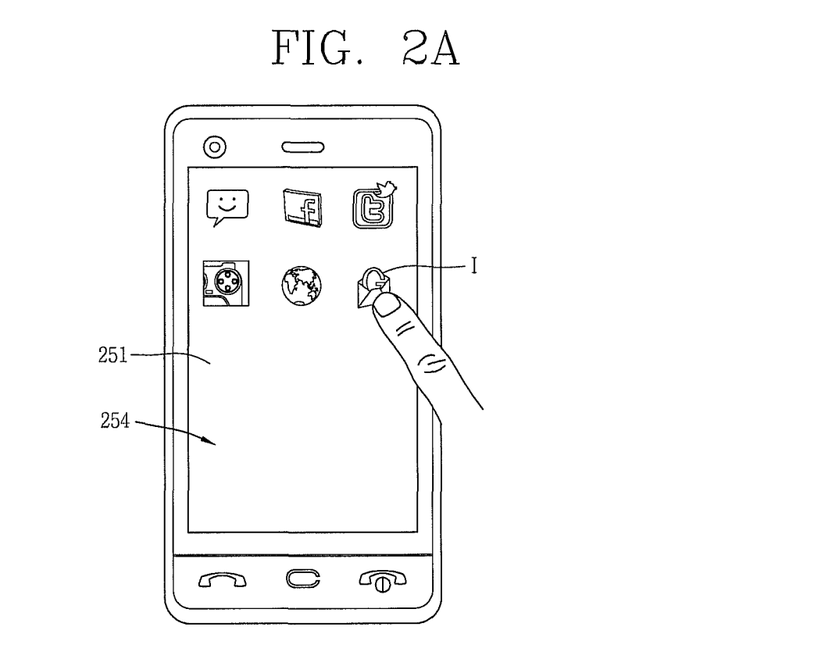
FIGS. 2A and 2B are front views of an exemplary electronic device in which a haptic module as embodied and broadly described herein is employed.
Figure 2B:
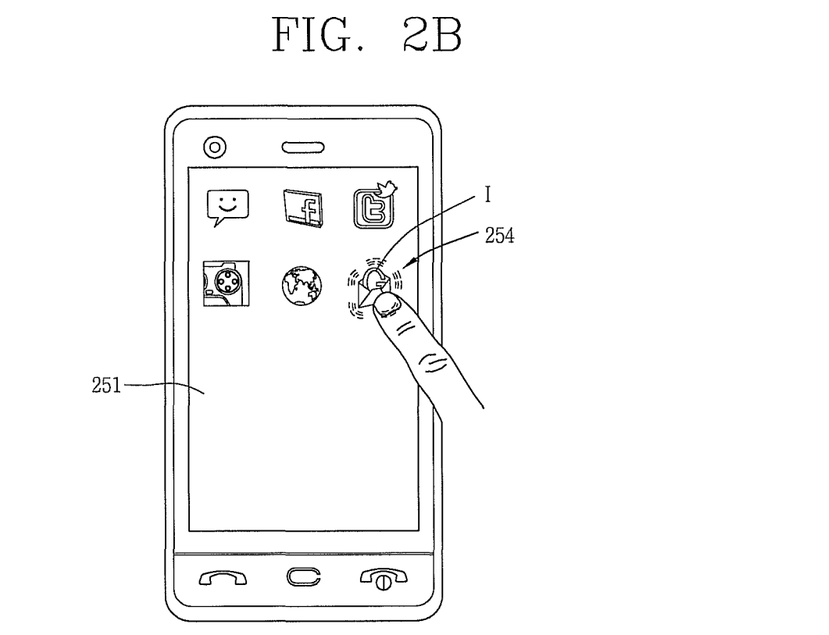

FIGS. 2A and 2B illustrate an example in which a haptic module as embodied and broadly described herein is driven.

Referring to FIG. 2A, a terminal may include a display module 251 provided on one surface, for example, the front surface, of a main body of the terminal. The display module 251 may include a touch sensor for sensing a touch input. The visual information output from the display module 251 may be realized in the form of an image, text, icons and the like. Referring to FIG. 2B, a haptic module 254 for generating various tactual effects may be provided in the terminal, allowing the user to not only transmit the tactual effect through direct contact, but also to feel the tactual effect through the muscular sense of a finger or an arm or other contact implement.

For example, when the user touches an icon I at one point of the display module 251, a shock may be applied to the point by the haptic module 254. The user may feel the tactual effect at that point through the shock, which may be applied in a direction somewhat orthogonal to the contact surface (hereinafter, for ease of discussion, referred to as a vertical shock). The vertical shock may be realized by the expansion of the haptic module 254. Furthermore, a protrusion may be generated at the icon I for a moment so that the user receives both visual and tactual feedback with respect to his or her input.

Figure 3A:
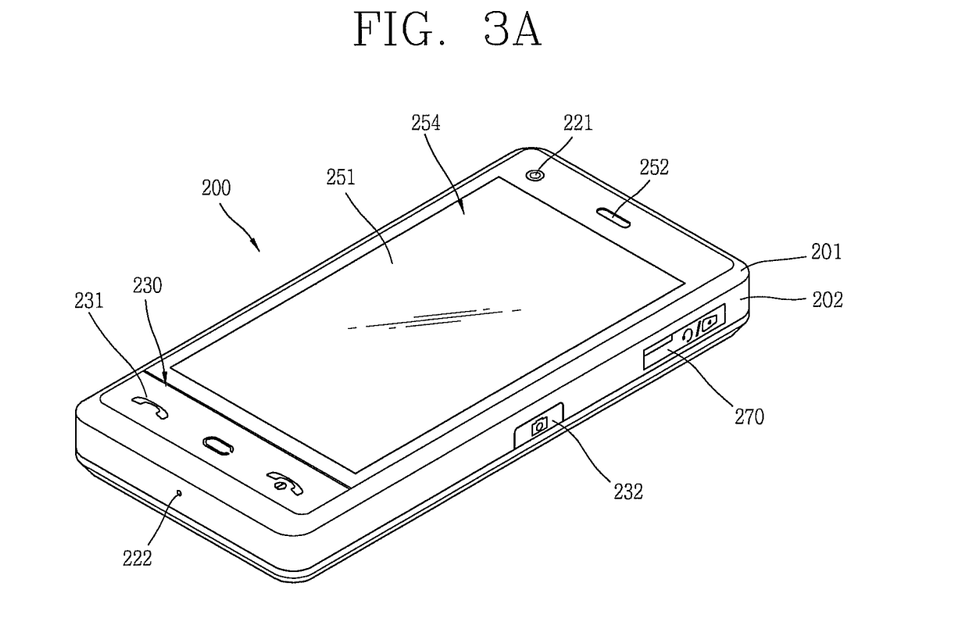
FIG. 3A is a front perspective view of an electronic device as embodied and broadly described herein.

Hereinafter, the hardware structure of a terminal that performs the operations shown in FIGS. 2A and 2B will be described in detail with respect to FIGS. 3A and 3B.

The exemplary electronic device discussed herein is a bar type electronic device. However, the present disclosure is not limited to this, and may be applied to a slide type in which two or more bodies are coupled to each other so as to perform a relative motion, a folder type, a swing type, a swivel type and other types of electronic devices.

The electronic device 200 having a case (casing, housing, cover, etc.) forming an outer appearance of a body may include a front case 201 and a rear case 202. A cover 203 may be mounted to the rear case 202. A space formed by the front case 201 and the rear case 202 may accommodate various components therein. In certain embodiments, at least one intermediate case may be disposed between the front case 201 and the rear case 202.

Such cases may be formed of an injection-molded synthetic resin material, or may be formed of a metallic material such as stainless steel (STS) or titanium (Ti), or other material(s) as appropriate.

A display module 251, an audio output device 252, a camera 221, a user input device 230 including one or more manipulation devices 231/232, a microphone 222, and an interface device 270 may be provided at the front case.

The display module 251 may occupy a large portion of a main surface of the front case 201. The audio output device 252 and the camera 221 may be arranged adjacent to one end of the display module 251, and the user input device 230 and the microphone 222 may be arranged adjacent to another end of the display 251. Another user input device 232, the interface device 270, and various other components, may be arranged on side surfaces of the front case 201 and the rear case 202.

The user input device 230 may be manipulated to receive a command for controlling the operation of the electronic device 200, and may include a plurality of manipulation devices 231 and 232. The manipulation devices 231 and 232 may include any type of devices that may be manipulated in a tactile manner.

Commands inputted through the first manipulation device 231 or the second manipulation device 232 may be set in various manners. For instance, the first manipulation device 231 may be configured to receive input commands such as START, END, SCROLL or the like. And, the second manipulation device 232 may be configured to receive input commands for controlling a level of sound outputted from the audio output device 252, or commands for converting the current mode of the display module 251 to a touch recognition mode. The display module 251 may form a touch screen together with a touch sensor 251c (refer to FIG. 4), and the touch screen may be an example of one type of user input device 230.

Figure 3B:
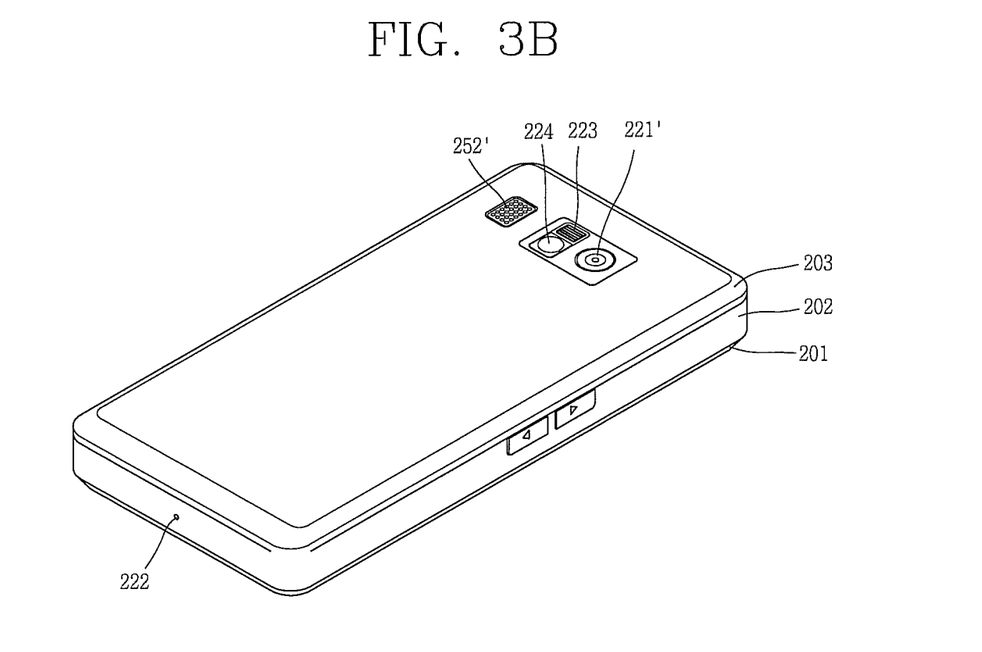
FIG. 3B is a rear perspective view of the electronic device shown in FIG. 3A.

Referring to FIG. 3B, a second camera 221' may be provided on the rear case 202. The second camera 221' may face a direction which is opposite to a direction faced by the first camera 221 (refer to FIG. 3A), and may have different functional characteristics, such as pixels, from those of the first camera 221.

For example, the first camera 221 may operate at a relatively lower resolution level. Thus, the first camera 221 may allow a user to capture his own face and transmit it to another party during a video call or the like. On the other hand, the second camera 221' may operate at a relatively higher resolution level such that it may allow a user to obtain higher quality pictures for later use. The cameras 221 and 221' may be installed at the body so as to rotate or pop-up.

A flash 223 and a mirror 224 may be provided close to the camera 221'. The flash 223 may operate in conjunction with the camera 221' when taking a picture using the camera 221'. The mirror 224 may cooperate with the camera 221' to allow a user to photograph himself in a self-portrait mode.

A second audio output device 252' may be arranged on a rear surface of the body. The second audio output device 252' may provide a stereo function together with the first audio output device 252 (refer to FIG. 3A), and may be used as a speakerphone during a call.

An antenna (refer to FIG. 1), such as an antenna for calling and also for receiving a broadcasting signal, may be arranged on the side surface of the body. The antenna, which may be part of the broadcast receiving module 111, may be installed so as to be retractable with respect to the body.

The power supply 290 for supplying power to the electronic device may be mounted in the body, or may be detachably mounted to the body.

The haptic module 254 may be operably coupled to the display module 251. The haptic module 254 may include an electro-active substance that may be contracted or expanded in response to power supply. The power supply to the electro-active substance may be controlled by a haptic reaction to a touch input so that the haptic module 254 may protrude to the outside of the body of the terminal or be depressed. For example, the haptic module 254 may be configured to be outwardly, or vertically, expanded. In this case, the haptic module 254 may output visual information by being expanded. Hereinafter, the haptic module will be described in detail with respect to FIGS. 4-6.

Figure 4:
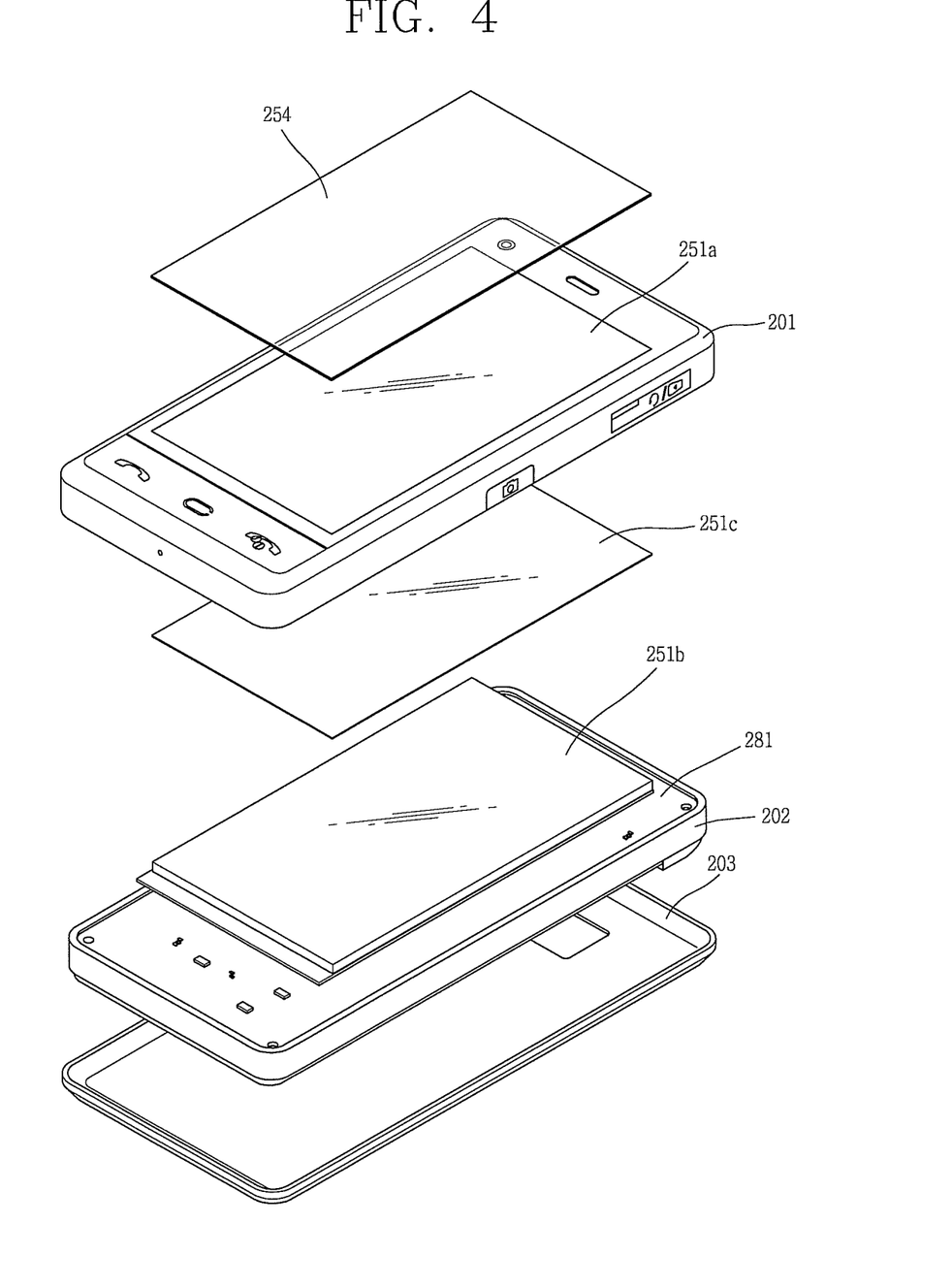
FIG. 4 is an exploded perspective view of the electronic device shown in FIGS. 3A and 3B.
Figure 5:
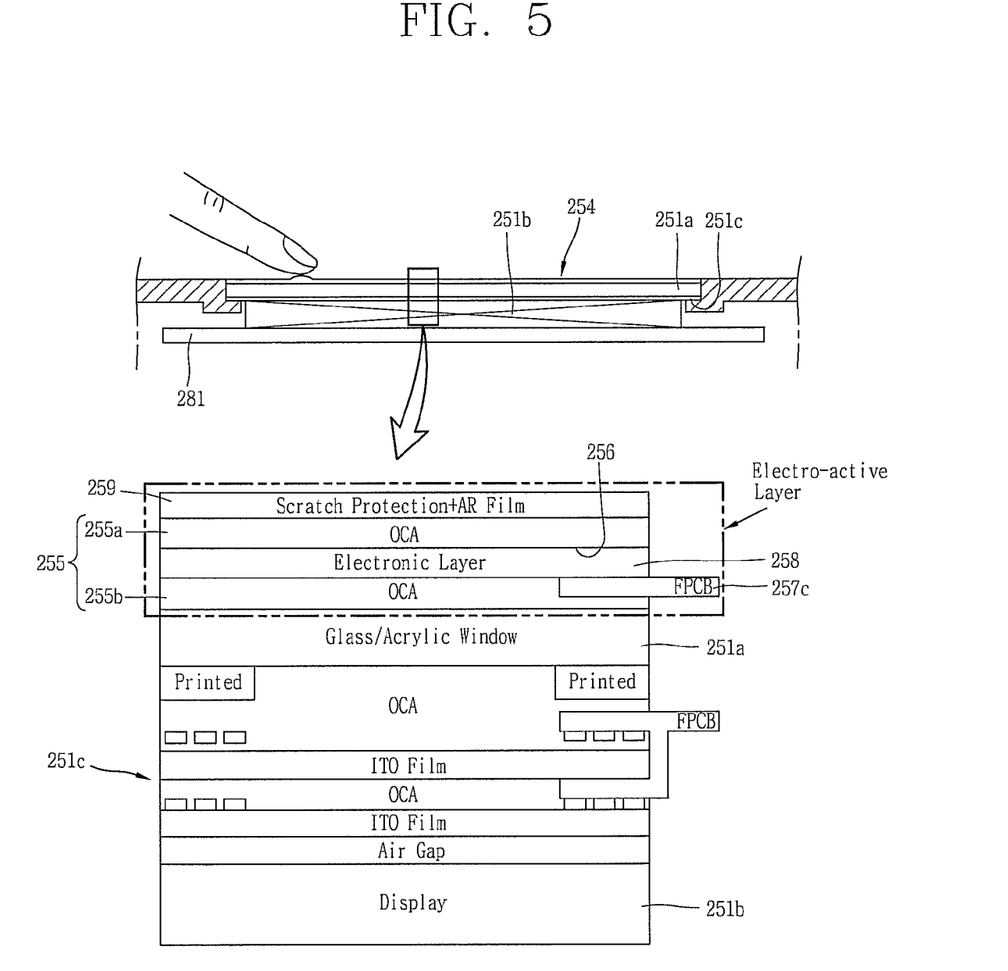
FIG. 5 is an enlarged side view of the electronic device shown in FIGS. 3A and 3B.

Referring to FIGS. 4 and 5, a window 251a may be provided on one surface of a front case 201. The window 251a may be formed of a material that transmits light, for example, light transmitting synthetic resin or reinforced glass. The window 251a may include a part that does not transmit light.

A display 251b may be mounted on the rear surface of the window 251a so as to display visual information and be covered by the window 251a. The display 251b may be one of a liquid crystal display (LCD), a thin film transistor-liquid crystal display (TFT LCD), an organic light emitting diode (OLED), a 3D display, or other type of display as appropriate.

The part of the window 251a that transmits light may have an area corresponding to the display 251b. Therefore, the user may view the visual information output by the display 251b from the outside.

A circuit board 281 may be mounted in the rear case 202 or an internal frame. The circuit board 281 may function as the controller 180 for operating various functions of the electronic device. A sound output element and a camera may be mounted in the circuit board 281. The sound output element may be, for example, a speaker and a receiver.

A touch sensor 251c for sensing a touch may overlap the display 251b. In detail, the touch sensor 251c may be mounted on the window 251a. The touch sensor 251c may be mounted on the rear surface (or the front surface) of the window 251a. The part of the window 251a that transmits light may form a region to which an input may be received by the touch sensor 251c. A change in a voltage and capacitance generated in a specific part of the window 251a may be converted into an electrical input signal so that the touch input is sensed. The window 251a, the touch sensor 251c, and the display 251b may together form the display module 251 (refer to FIG. 3A). In this case, the display module 251 operates as a touch screen.

As illustrated in FIG. 4, the haptic module 254 may be mounted on the front surface of the window 251a. As shown in FIG. 5, the haptic module 254 may include a ductile member 255, a chamber 256, an electro-active substance 258, and a power supply 257 (see FIG. 7A).

The chamber 256 may be formed as, for example, a single cell, or as a plurality of cells having an empty space restricted by barrier ribs. In this case, the haptic module 254 is formed so that a plurality of cells are arranged in a matrix and is controlled by the controller 180 so that at least one cell reacts to the touch input.

As illustrated in FIG. 5, the chamber 256 may be covered with the ductile member 255.

The ductile member 255 may be made of an elastically deformable material and may be disposed such that a deformation of the ductile member 255 is exposed to the outside of the main body. For example, the ductile member 255 may include an optically clear adhesive (OCA) material. However, embodiments are not limited to the above. The ductile member 255 may be, for example, silicon membrane or urethane membrane.

The ductile member 255 may be integrated with the window 251a and may be exposed to the outside while being mounted on the window 251a.

Figure 7A:
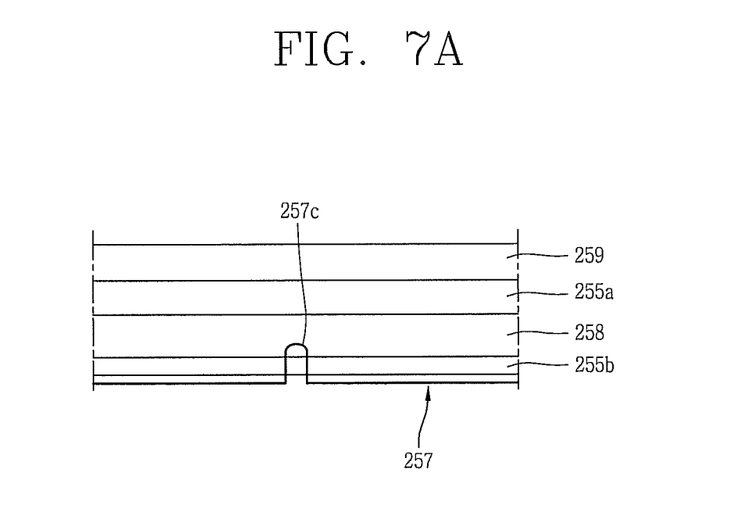
FIGS. 7A to 7D are sectional views illustrating operation of the haptic module shown in FIG. 5.
Figure 7B:
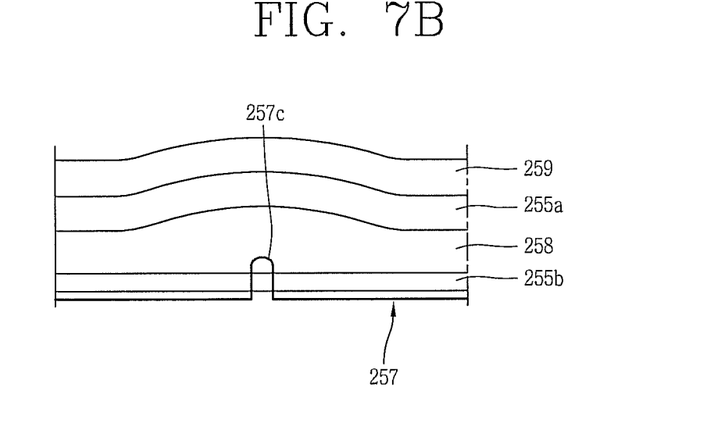

The electro-active substance 258 may be accommodated in the chamber 256 and may be formed so as to press the ductile member 255 as it is expanded using the energy conversion of the power supplied. Referring to FIGS. 7A and 7B together with FIG. 5, a part of the ductile member 255 may be expanded by the expansion of the electro-active substance.

The electro-active substance may be an electro-active polymer (EAP) that reproducibly represents expanding, contracting, and bending phenomenon. The EAP may be, for example, inherently conductive polymers (ICPS), inherently dissipative polymers (IDPS), electro-conductive plastics, ionic polymer/metal composite (IPMC), and carbon nanoparticle containing conductive polymer. The electro-active polymer may be in a gel type or in a film type. The electro-active polymer manufactured in the film type includes at least one of carbon fiber reinforced plastic, fine ceramics, and crystallized glass. The carbon fiber reinforced plastic is obtained by putting carbon fiber into plastic to reinforce the resultant material in order to create a strong and light material. The fine ceramics (or new ceramics) may be a magnetic material sintered using a nitride and a carbide that is a naturally or artificially synthesized inorganic compound. In addition, the crystallized glass is referred to as glass ceramics and is obtained by technically crystallizing amorphous glass so that the crystallized glass has characteristics that conventional glass does not have.

As illustrated in FIG. 5, the ductile member 255 may include a plurality of optically clear adhesive (OCA) films 255a and 255b separated from each other to define the chamber 256 in which the electro-active substance 258 may be received. A film 259 for protecting the display module 251 may be provided on the outermost OCA film 255a.

The electro-active substance 258 may be accommodated in the chamber 256 in the form of a liquid or a film. When the electro-active substance is a liquid, the chamber 256 may be closed in the length direction as well as in the thickness direction of the terminal. However, when the electro-active substance 258 forms an electro-active film 258, the electro-active film 258 overlaps the ductile member 255 in the thickness direction and is contracted and expanded by power supply. Hereinafter, the case in which the electro-active substance is formed as an electro-active film 258 will be described as an example.

In this case, the ductile member 255 and the electro-active film 258 may all be light transmitting so that the ductile member 255 and the electro-active film 258 perform a display function together with the display module 251.

The haptic module 254 may supply power to the electro-active film 258 when the touch sensor 251c senses a touch input. In detail, the power supply to the electro-active film 258 is performed by the power supply 257, which transforms the ductile member 255 by the contraction or expansion of the electro-active film 258. A flexible circuit board 257c may be mounted on one side of the electro-active film 258. The electric energy supplied through the flexible circuit board 257c may be converted into the deformation energy of the electro-active substance.

Figure 6:
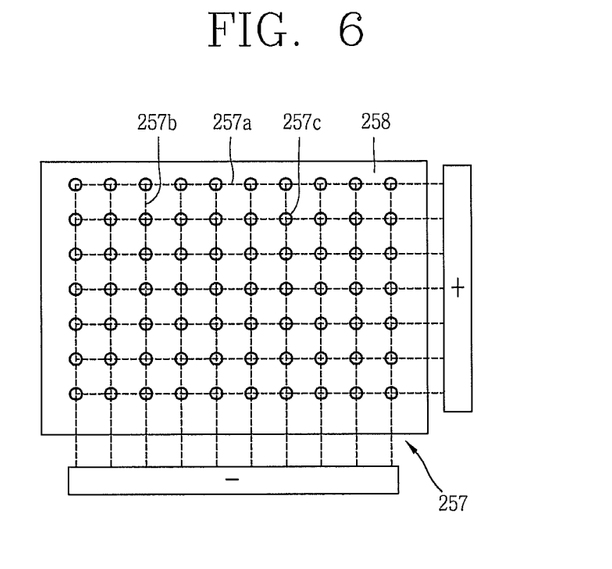
FIG. 6 is a conceptual diagram of a power supply line of an exemplary haptic module of the electronic device shown in FIG. 5.

Referring to FIG. 6, the power supply 257 may be arranged in a matrix to supply power to the set point of the chamber 256. The power supply 257 may include a first power supply line 257a for supplying power in a corresponding row of the matrix and a second power supply line 257b for supplying power in a corresponding column of the matrix. The power supply 257 provides electric signals to the X and Y coordinates using the intersection of the first and second power supply lines 257a and 257b. Therefore, a positive electrode may be supplied through one of X and Y and a negative electrode may be supplied through the other of X and Y. In this case, an area in units of points may be controlled.

For example, the first and second power supply lines 257a and 257b may be patterned in the electro-active film 258.

Unlike the above, the power supply 257 may be patterned on a substrate like an ITO film and may overlap the electro-active film 258.

Unlike the above, when the chamber 256 includes cells arranged in a matrix, the intersections 257c of the first and second power supply lines 257a and 257b may be arranged in the cells. The intersections 257c may be inserted into the electro-active substance.

Embodiments are is not limited to the above, and the positive power may be supplied to the upper side of the electro-active film 258 and the negative power may be supplied to the lower side of the electro-active film 258 at the intersection 257c of the first and second power supply lines 257a and 257b. In order to realize such a structure, a pair of electrode layers (for example, a carbon film and an ITO film) may be provided on and under (i.e., on two opposite sides of) the electro-active film 258.

In detail, referring to FIGS. 7A and 7B, when the touch sensor 251c senses the touch input, the power supply 257 supplies power to the area corresponding to the touch point.

The electro-active film 258 is expanded by electric energy so that at least the outermost OCA film 255a protrudes. Therefore, the ductile member 255, and in particular the OCA film 255a, may be formed of a material having large elasticity like a silicon based material. When the power supply from the power supply 257 is stopped, the electro-active film 258 returns to an original state so that the ductile member 255 also returns to the original state.

Figure 7C:
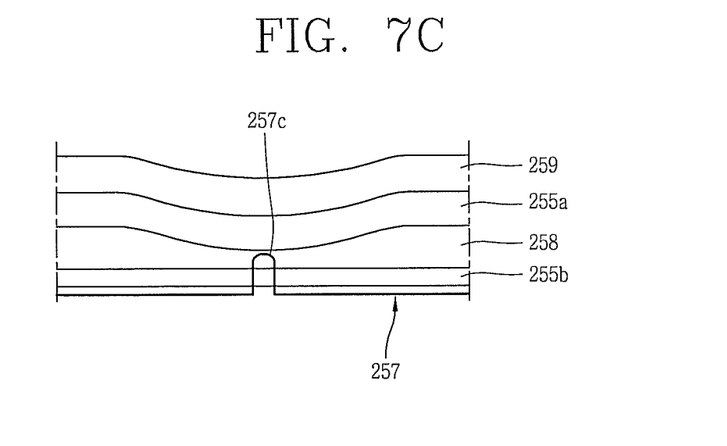

Referring to FIGS. 7A and 7C, in the state before the touch sensor 251c senses the touch input (see FIG. 7A), the power supply 257 supplies power having a magnitude in which the outer OCA film 255a of the ductile member 255 is planar with respect to the electro-active film 258. Then, when the touch sensor 251c senses the touch input, the power source supply 257 reduces the magnitude of the power so that the visual haptic function in which the touched point is repressed may be realized. In this case, when the ductile member 255/OCA films 255a/255b is formed of a material having small elasticity like an acryl-based material, the ductile member 255 may remain planar and only the electro-active film 258 contracts.

Furthermore, the power supply 257 may sequentially change the magnitude of the supplied power in accordance with the column or row of the matrix. It is possible to realize the effect in which the screen of the terminal waves on the outer surface of the terminal.

Figure 7D:
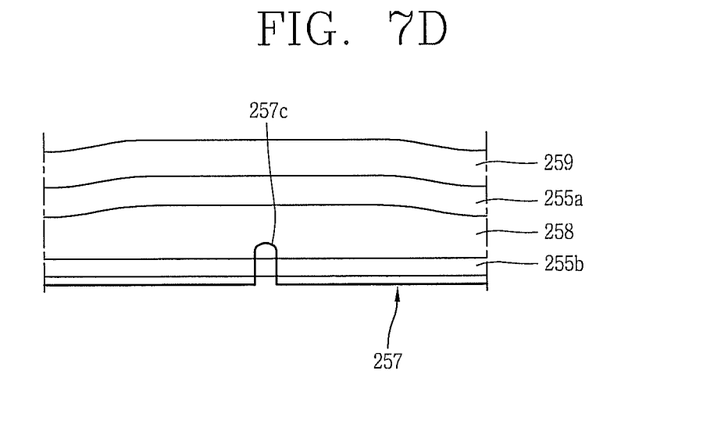

Referring to FIGS. 7A and 7D, in this case, as the electro-active film 258 expands, the ductile member 255 may not expand. That is, the electro-active film 258 presses the ductile member 255, however, the ductile member 255 somewhat resists against expansive force to substantially maintain the shape thereof. In detail, as illustrated in FIG. 7D, the ductile member 255 is only slightly transformed, and thus a user may feel that the ductile member 255 maintains a substantially planar surface. In this case, a mechanism in which the virtual pressure of the electro-active material provides tactile haptic to the user, however, the ductile member 255 is not transformed.

Figure 8A:
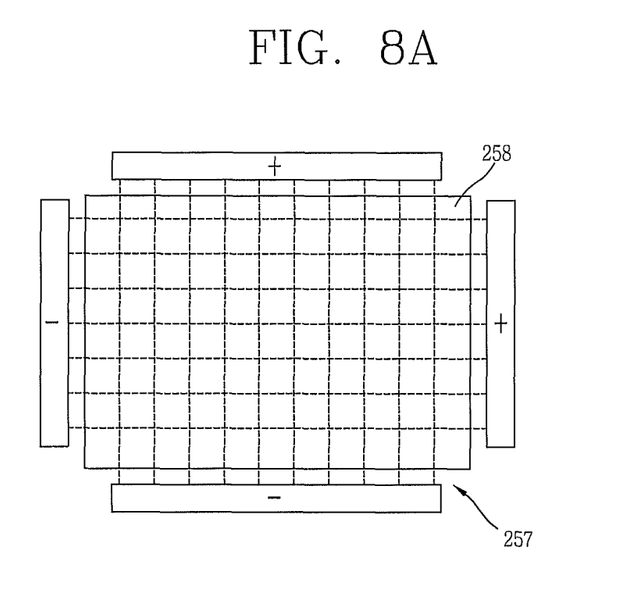
FIGS. 8A and 8B illustrate a power supply device.
Figure 8B:
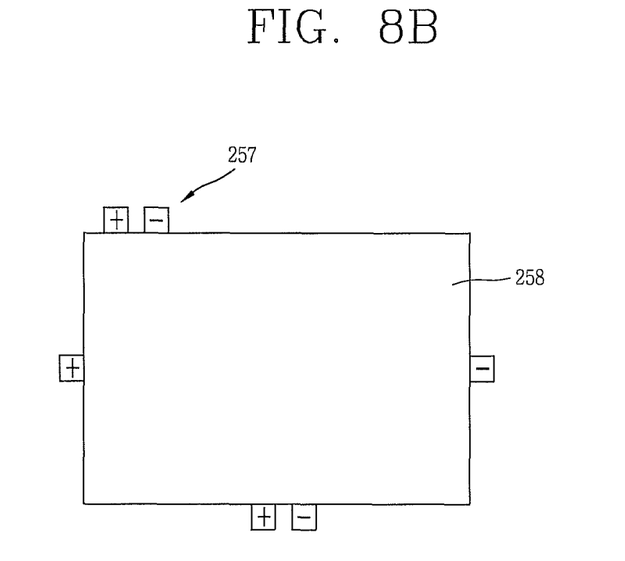

In addition, a control concept in units of lines or surfaces is realized through the deformation of the power supply 257. FIGS. 8A and 8B illustrate modifications to the power supply 257, which may include a pair of positive and negative electrodes facing each other. That is, electric signals are provided from top and bottom or from right and left. In this case, line control may be performed.

As illustrated in FIG. 8B, the power supply 257 may be formed so that the positive and negative electrodes thereof provide the electric signals to the entire surface. In this case, surface control may be performed.

Figure 9:
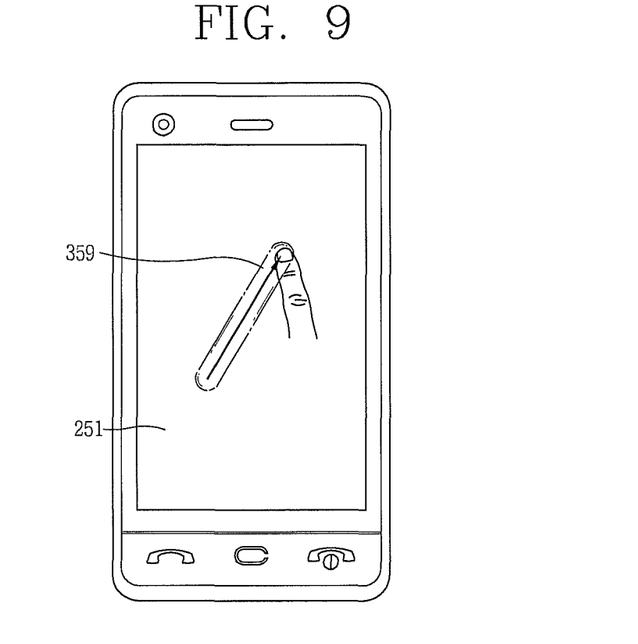
FIGS. 9 to 11 illustrate user interfaces applicable to an electronic device, according to another embodiment as broadly described herein.
Figure 10:
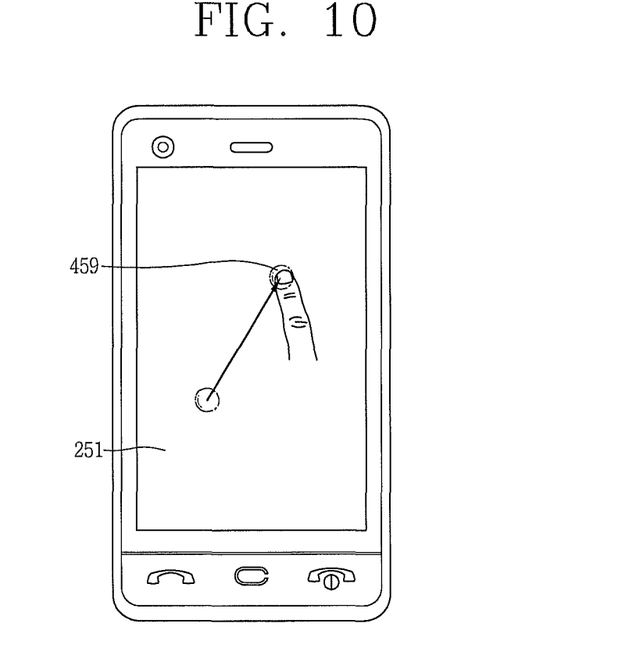
Figure 11:
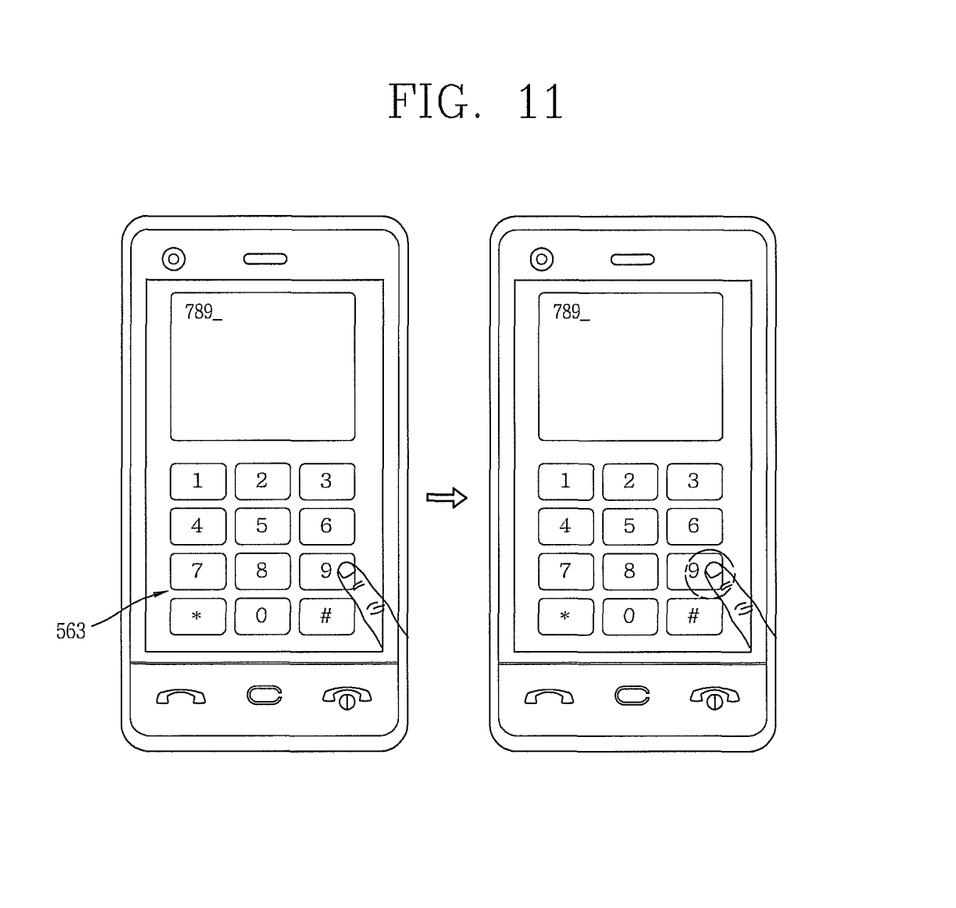

FIGS. 9 to 11 illustrate exemplary user interfaces according to another embodiment as broadly described herein. In these embodiments, the touch sensor may sense a touch point with respect to a touch input and output information on the touch point.

As illustrated in FIG. 9, the haptic module may protrude along a touch path based on a change in the touch point. For example, when a user drags a pointing implement the display module 251, a continuous protruding pixel 359, or trace, may be formed on the front surface of the terminal in a drag direction. When the touch input is dragged to the right, the protruding pixel 359 protrudes to the right corresponding to the drag. In addition, the amount of deformation of the ductile member may be controlled in accordance with the magnitude of the supplied power. For example, the height of the protruding pixel 359 may be controlled by controlling the magnitude of the power.

Referring to FIG. 10, when a specific touch input is sensed, the controller 180 may determine which control command the haptic module 254 performs. For example, when the user flicks the display module 251, a discontinuous protruding pixel 459 may be formed in a flicking direction. For example, the protruding pixel 459 may protrude from the starting point and the ending point of flicking.

Referring to FIG. 11, the display may display a virtual keyboard and the ductile member may be controlled so that, in response to an input to a certain key of the virtual keyboard, the part corresponding to the certain key protrudes. That is, the haptic module may press a specific key of a virtual keyboard 563 corresponding to the touch point in response to the touch input. When the user touches the specific key of the virtual keyboard 563, the specific key may protrude. Embodiments are not limited to the above, and tactual haptic in which the specific key is not transformed, but rather, only the expansive force is transmitted to the specific key, may be performed.

Figure 12:
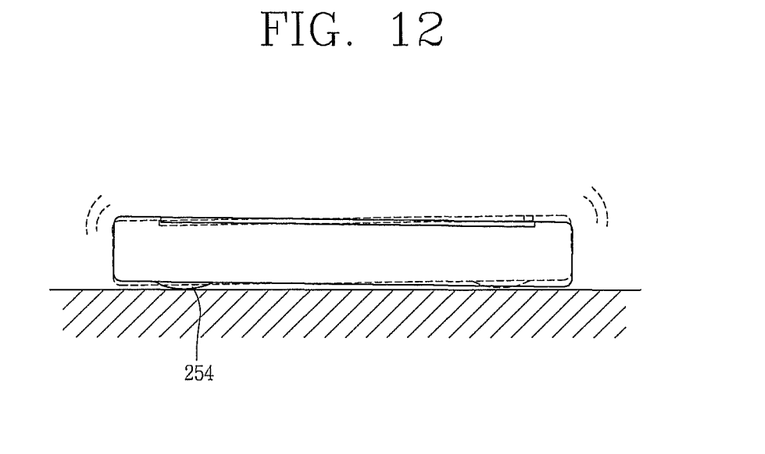
FIG. 12 illustrates a haptic indicator for an electronic device in accordance with embodiments as broadly described herein.

In the modification shown in FIG. 12, the ductile member, the chamber, and the power supply may provide an indicator of the reception of radio signals. That is, when call signals, data, or characters are received, in order to inform the user of the reception of the call signals, the data, or the characters, the electro-active substance may be expanded instead of generating vibration or sound. For example, the haptic module 254 may be provided on the rear surface (for example, a battery cover or a rear case) of the terminal and the ductile member may be transformed when the call signals or the characters are received.

Figure 13:
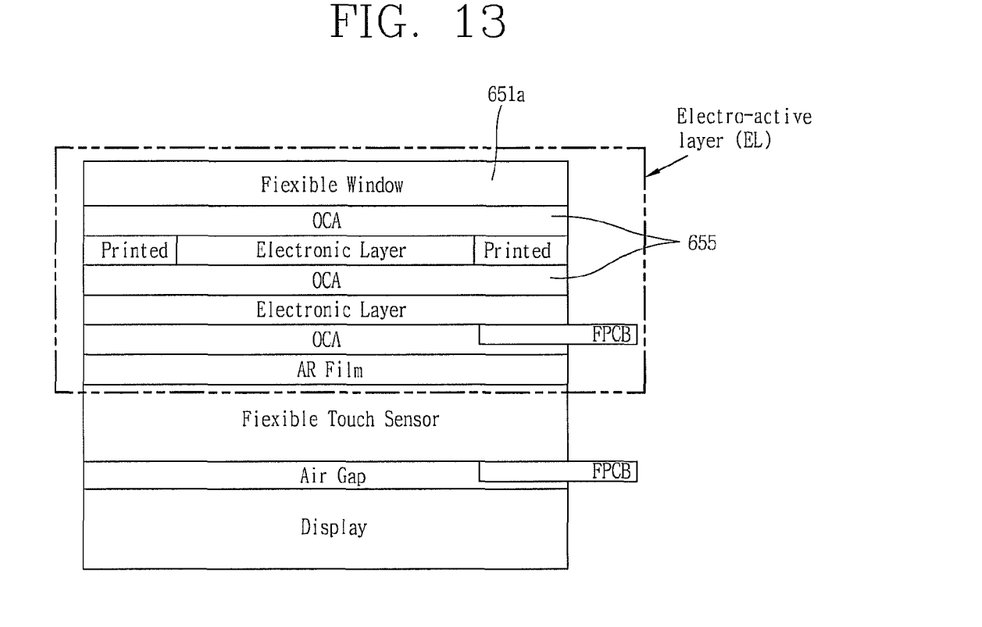
FIGS. 13 and 14 are sectional views of electronic devices in accordance with other embodiments as broadly described herein according to the present invention.
Figure 14:
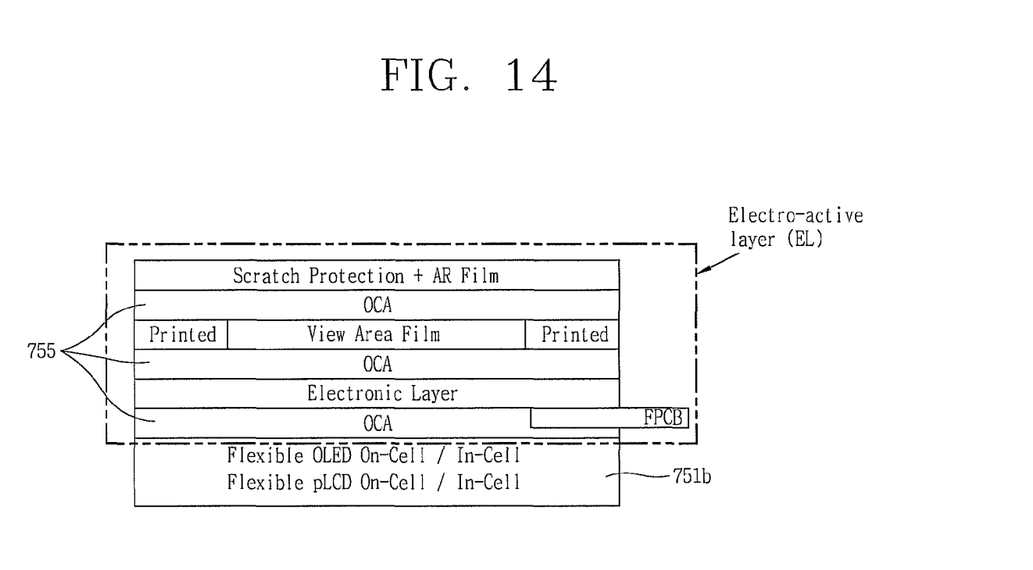

FIGS. 13 and 14 are sectional views illustrating still other embodiments of the electronic device as broadly described herein.

Referring to FIG. 13, a flexible window 651a is mounted on the body of the terminal and the ductile member 655 of the haptic module is attached to the rear surface of the flexible window 651a. That is, a flexible touch structure including an electro-active layer (EL) may replace the glass or acryl window previously described.

The flexible window 651a may be formed of a thin light transmitting film. In this case, when printing is required, a color film referred to as a view area film may be laminated on the flexible window 651a. The electro-active layer may be formed of the electro-active film or a liquid. A silicon-based OCA film may be provided on and under the electro-active layer.

Referring to FIG. 14, a flexible display 751b for outputting visual information may be mounted in the terminal body and the ductile member 755 of the haptic module may be mounted in the flexible display 751b.

A thin film transistor liquid crystal display (TFT LCD) may not bend. However, a plastic LCD or an organic light emitting display (OLED) display is flexible. In this case, a display integrated type may be formed using an on-cell method or an in-cell method in performing a touch.

A film for protecting the display may be a scratch protecting film having an anti-reflection (AR) preventing function and may be integrated with the electro-active film.

In an electronic device having the above structure, the protruding pixel may be formed on the outer appearance of the terminal. Therefore, a haptic module capable of outputting a visual effect as well as a tactual effect may be realized. In addition, a new feedback mode for characters or call signals may be provided by applying the above.

In addition, a haptic module for providing feedback for a touched point may be realized by partially supplying power to the electro-active substance.

In addition, a magnitude of the power may be sequentially changed so that a new visual effect is realized. In addition, through the visual effect, a new user interface may be provided.

An electronic device is provided including a haptic device that provides improved tactual performance and an alarming function.

An electronic device as embodied and broadly described herein may include a terminal main body, a ductile member made of an elastically deformative material and disposed such that a deformation of the ductile member is exposed to the outside of the main body, a chamber defined by the ductile member, an electro-active substance accommodated in the chamber and configured to be contracted or expanded by power supply, and a power supply unit configured to supply power to the electro-active substance so that the ductile member is transformed by the electro-active substance being contracted or expanded.

The electronic device may also include a haptic module including the ductile member, the chamber, and the power supply unit to provide feedback to a touch input. The main body includes a display and a touch sensor that overlaps the display. The haptic module is configured to supply power to the electro-active substance when the touch sensor senses the touch input.

The touch sensor may be controlled to sense a touch point with respect to the touch input. The haptic module may be controlled to output information related to the touch point.

The display may display a virtual keyboard. The ductile member may be controlled so that, in response to an input to a certain key of the virtual keyboard, a part corresponding to the certain key protrudes.

The amount of deformation of the ductile member may be controlled in accordance with the magnitude of the supplied power.

The electro-active material may include at least one of carbon fiber reinforced plastic, fine ceramics, and crystallized glass. The ductile member may include a plurality of optically clear adhesive (OCA) films separated from each other to define the chamber. The electronic device may also include an electro-active film made of the electro-active substance and provided between the plurality of OCA films.

A window may be mounted in the main body. A touch sensor may be provided on a rear surface of the window. The ductile member may be provided on a front surface of the window.

A flexible window may be mounted in the main body. The ductile member may be attached to a rear surface of the flexible window.

A flexible display for outputting visual information may be mounted in the main body. The ductile member may be mounted in the flexible display.

The power supply unit may be arranged in a matrix to supply power to a set point in the chamber. The power supply unit may include a first power supply line for supplying power in a column of the matrix and a second power supply line for supplying power in a row of the matrix. The power supply unit may sequentially change the magnitude of supplied power in the column or row of the matrix.

The ductile member, the chamber, and the power supply unit may be controlled to inform reception of radio signals. The main body may include a front surface and a rear surface. The ductile member may be provided on the rear surface to be transformed when call signals or characters are received.

An electronic device as embodied and broadly described herein may include a terminal main body including a front surface and a rear surface, a display provided to be exposed from the front surface of the main body, a touch sensor formed to sense a touch input and provided to overlap the display, and a haptic module including an electro-active substance formed to be contracted or expanded by power supply to control power supply to the electro-active substance by a haptic reaction to the touch input and to be protruded to or depressed from the outside of the main body.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An electronic device, comprising:
   a main body;
   a ductile layer made of an elastically deformable material and positioned such that a deformation of the ductile layer extends to an outside of the main body;
   a chamber defined in the ductile layer;
   an electro-active material accommodated in the chamber and configured to be contracted or expanded in response to a supply of power thereto;
   a power supply device configured to supply power to the electro-active material so as to deform the ductile layer as the electro-active material is contracted or expanded in response to the power supplied by the power supply device; and a window mounted in the main body having a surface facing outside of the main body, wherein the ductile layer is disposed to cover the surface of the main body.

2. The electronic device of claim 1, wherein the ductile layer, the chamber having the electro-active material accommodated therein, and the power supply device form a haptic module configured to provide feedback in response to a touch input received at the main body.

3. The electronic device of claim 2, wherein the main body comprises a display and a touch sensor that overlaps the display, and wherein the power supply device is configured to supply power to the electro-active material in response to the touch input received at the touch sensor.

4. The electronic device of claim 3, wherein the touch sensor senses a touch point corresponding to the touch input, and wherein the haptic module is configured to output information corresponding to the touch point.

5. The electronic device of claim 4, wherein the haptic module is configured to protrude outward from the main body at a point corresponding to the touch point in response to the touch input.

6. The electronic device of claim 4, wherein the haptic module is configured to protrude outward from the main body along a touch path beginning at the touch point and extending to a termination point.

7. The electronic device of claim 4, wherein the display displays a virtual keyboard, and wherein the ductile layer is configured to deform in response to an input at a certain key of the virtual keyboard such that a part of the display corresponding to the certain key protrudes outward from the main body.

8. The electronic device of claim 1, wherein an amount of deformation of the ductile layer corresponds to a magnitude of power supplied to the electro-active material by the power supply device.

9. The electronic device of claim 1, wherein the electro-active material comprises at least one of a carbon fiber reinforced plastic material, a fine ceramic material, or a crystallized glass material.

10. The electronic device of claim 1, wherein the ductile layer comprises a plurality of optically clear adhesive (OCA) films separated from each other so as to define the chamber.

11. The electronic device of claim 10, wherein the electro-active material forms an electro-active film positioned between adjacent OCA films of the plurality of OCA films.

12. The electronic device of claim 1, further comprising:
a touch sensor provided on a first surface of the window, and the first surface of the window facing an interior of the main body, wherein the ductile layer is provided on a second surface of the window, the second surface of the window facing outside of the main body.

13. The electronic device of claim 1, further comprising:
a flexible display mounted in the main body, wherein the ductile layer is coupled to the flexible display.

14. The electronic device of claim 1, wherein the power supply device comprises a plurality of power lines arranged in a matrix to supply power to at least one set point in the chamber.

15. The electronic device of claim 14, wherein the plurality of power lines of the power supply device comprises:
at least one first power supply line for supplying power to a corresponding at least one column of the matrix; and
at least one second power supply line for supplying power to a corresponding at least one row of the matrix.

16. The electronic device of claim 14, wherein the power supply device sequentially changes a magnitude of power supplied to a column or a row of the matrix.

17. The electronic device of claim 16, wherein the main body comprises a front surface and a rear surface, and wherein the ductile layer is provided on the rear surface of the main body and is configured to deform and protrude outward form the main body in response to reception of a call signal or character signal so as to provide an indicator of the reception.

18. An electronic device, comprising:
a main body including a front surface and a rear surface;
a display coupled to the main body and visible from the front surface of the main body;
a touch sensor aligned with the display so as to sense a touch input received at the display; and
a haptic module coupled to the main body, the haptic module including an electro-active material and configured to be contracted or expanded based on power supplied thereto in response to the touch input such that the haptic module protrudes from the main body or is depressed into the main body,
wherein the ductile layer comprises a plurality of optically clear adhesive (OCA) films separated from each other so as to define the chamber.

19. The electronic device of claim 18, wherein the haptic module comprises:
a ductile layer including an elastically deformable material;
an electro-active film aligned with the ductile layer and formed of an electro-active material that is contracted or expanded in response to a supply of power; and
a power supply device that supplies power to the electro-active film, wherein the electro-active film is contracted or expanded in response to the power supplied thereto by the power supply device, and the ductile layer is deformed in response to the contraction or expansion of the electro-active film such that the ductile layer protrudes outward from the main body.

* * * * *